US007456927B2

United States Patent
Kim

(10) Patent No.: US 7,456,927 B2
(45) Date of Patent: Nov. 25, 2008

(54) LIQUID CRYSTAL DISPLAY DEVICE AND METHOD OF FABRICATING THE SAME

(75) Inventor: Chang-Young Kim, Gyoungsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 596 days.

(21) Appl. No.: 11/129,461

(22) Filed: May 16, 2005

(65) Prior Publication Data

US 2005/0212998 A1    Sep. 29, 2005

Related U.S. Application Data

(62) Division of application No. 10/447,236, filed on May 29, 2003, now Pat. No. 6,894,744.

(30) Foreign Application Priority Data

Dec. 23, 2002    (KR) .............................. 2002-82709

(51) Int. Cl.
*G02F 1/13* (2006.01)
(52) U.S. Cl. ....................... 349/187; 349/110
(58) Field of Classification Search .................. None
See application file for complete search history.

(56) References Cited

U.S. PATENT DOCUMENTS

| 5,598,285 | A | 1/1997 | Kondo et al. |
|---|---|---|---|
| 5,745,207 | A | 4/1998 | Asada et al. |
| 5,805,247 | A | 9/1998 | Oh-e et al. |
| 5,831,701 | A | 11/1998 | Matsuyama et al. |
| 5,838,037 | A | 11/1998 | Masutani et al. |
| 5,946,060 | A | 8/1999 | Nishiki et al. |
| 5,990,987 | A | 11/1999 | Tanaka |
| 6,028,653 | A | 2/2000 | Nishida |
| 6,040,887 | A | 3/2000 | Matsuyama et al. |
| 6,097,454 | A | 8/2000 | Zhang et al. |
| 6,266,166 | B1 | 7/2001 | Katsumata et al. |
| 6,784,966 | B2 * | 8/2004 | Maeda et al. ............... 349/141 |
| 2001/0017677 | A1 * | 8/2001 | Kishimoto et al. .......... 349/106 |

(Continued)

FOREIGN PATENT DOCUMENTS

JP        9-5764        1/1997

(Continued)

OTHER PUBLICATIONS

Lee, S.H., et al., "High-Transmittance, Wide-Viewing-Angle Nematic Liquid Crystal Display Controlled by Fringe-Field Switching", Asia Display 98, p. 371-374.*

(Continued)

*Primary Examiner*—Richard H Kim
(74) *Attorney, Agent, or Firm*—McKenna Long & Aldridge LLP

(57) ABSTRACT

A method of fabricating a liquid crystal display device includes providing a first substrate, forming a conductive layer on a rear surface of a second substrate, forming a black matrix layer on a front surface of the second substrate, baking the black matrix layer and annealing the conductive layer, forming a color filter layer on the front surface of the second substrate, and attaching the first and second substrates.

18 Claims, 4 Drawing Sheets

U.S. PATENT DOCUMENTS

2003/0043318 A1* 3/2003 Kim .......................... 349/106
2003/0081160 A1* 5/2003 Ihida et al. ................. 349/113

FOREIGN PATENT DOCUMENTS

JP         9-73101        3/1997

OTHER PUBLICATIONS

Matsumoto, S., et al., "LP-A: Display Characteristics of In-Plane-Switching (IPS) LCDs and a Wide-Viewing Angle 14.5. TFT-LCD", Euro Display 96, p. 445-448.*

Wakemoto, H., et al., "38.1: An Advanced In-Plane-Switching Mode TFT-LCD", SID 97 Digest, p. 929-932.*
Kiefer, R. et al., "P2-30 In-Plane Switching of Nematic Liquid Crystals", Japan Display 92, p. 547-550.*
Ohta, M., et al., "S30-2 Development of Super-TFT-LCDs with In-Plane Switching Display Mode", Asia Display 95, p. 707-710.*
Oh-E, M. et al., "S23-1 Principles and Characteristics of Electro-Optical Behaviour with In-Plane Switching Mode", Asia Display 95, p. 577-560.*
Endoh, S., et al., "Advanced 18.1-inch Diagonal Super-TFT-LCDs with Mega Wide Viewing Angle and Fast Response Speed of 20ms" IDS 99, p. 187-190.*

* cited by examiner

LIQUID CRYSTAL DISPLAY DEVICE AND METHOD OF FABRICATING THE SAME

The present application is a Divisional of U.S. patent application Ser. No. 10/447,236, filed May 29, 2003, now U.S. Pat. No. 6,894,744 which claims priority to Korean Patent Application No. 82709/2002, filed Dec. 23, 2002, the contents of which is incorporated herein by reference in its entirety.

The present invention claims the benefit of Korean Patent Application No. 82709/2002 filed in Korea on Dec. 23, 2002, which is hereby incorporated by reference.

BACKGROUND OF THE INVENTION

1. Field of the Invention

The present invention relates to a display device and method of fabricating a display device and, more particularly, to a liquid crystal display device and a method of fabricating a liquid crystal display device.

2. Description of the Related Art

As mobile electronic devices, such as a mobile phone, personal digital assistants (PDAs) and notebook computers, are developed, flat panel display devices having light weight and thin profiles are required. Various types of flat panel display devices are being developed including liquid crystal display (LCD) devices, plasma display panel (PDP) devices, field emission display (FED) devices, and vacuum fluorescent display (VFD) devices. Among these various devices, the LCD devices are appealing because of their mass production techniques, ease of driving, and implementation of high picture quality.

In the liquid crystal display device, there are various display modes according to arrangement of liquid crystal molecules of a liquid crystal layer. A Twisted Nematic (TN) mode is commonly used because of its simple display of black and white images, fast response time, and low driving voltage. In the TN-mode liquid crystal display device, liquid crystal molecules that are initially aligned along a horizontal direction to the substrate are subsequently aligned almost vertically to the substrate when a voltage is applied to the liquid crystal layer. Accordingly, viewing angle becomes narrow due to a refractive anisotropy of the liquid crystal molecules when the voltage is applied.

To solve the viewing angle problem, there have been proposed LCD devices with various display modes having wide viewing angle characteristics. Of the LCD devices, an in-plane switching (IPS) mode liquid crystal display device has been adopted in which at least a pair of electrodes are arranged in parallel within a pixel region to form a horizontal electric field substantially parallel to the surface of a substrate, thereby aligning liquid crystal molecules within a single plane.

FIG. 1A is a plan view of an in-plane switching (IPS) mode liquid crystal display device according to the related art, and FIG. 1B is a cross sectional view along I-I' of FIG. 1A according to the related art. In FIGS. 1A and 1B, a pixel region of a liquid crystal display panel 1 is defined by horizontal and vertical arrangements of a gate line 3 and a data line 4, and a thin film transistor 10 is formed at an intersection of the gate line 3 and the data line 4 of the pixel region. The thin film transistor 10 includes a gate electrode 11 formed on a first substrate 20, a gate insulating layer 22 formed over the first substrate 20, a semiconductor layer 12 formed on the gate insulating layer 22, a source electrode 13 and a drain electrode 14 formed on the semiconductor layer 12, and a passivation layer 24 formed over the first substrate 22. In addition, a plurality of common electrodes 5 and a plurality of pixel electrodes 7 are arranged substantially parallel to the data line 4 within the pixel region, and a common line 16 and a pixel electrode line 18 are connected to the common electrode 5 and the data line 7 at a middle portion of the pixel region. The common electrode 5 is formed on the first substrate 20 and the pixel electrode 7 is formed on the gate insulating layer 22. A black matrix 32 and a color filter layer 34 are formed on the second substrate 30, and a liquid crystal layer is disposed between the first and second substrates 20 and 30, thereby completing the IPS mode liquid crystal display panel 1.

In the IPS-mode liquid crystal display device, the liquid crystal molecules are aligned substantially parallel to the common electrode 5 and the pixel electrode 7. When a signal is supplied to the pixel electrode 7 as the thin film transistor 10 is enabled, a horizontal electric field is generated between the common electrode 5 and the pixel electrode 7, which is substantially parallel to the liquid crystal display panel 1. Accordingly, the liquid crystal molecules are rotated within the same plane along the horizontal electric field, so that a gray level due to the refractive anisotropy of the liquid crystal molecules can be prevented.

However, in the IPS-mode liquid crystal display device, if a vertical electric field is generated along a vertical direction to the liquid crystal display panel 1 (that is, in the direction from the first substrate 20 to the second substrate 30), the vertical electric field adversely affects the horizontal electric field of the liquid crystal layer 40. Accordingly, the horizontal electric field formed on the liquid crystal layer 40 is not formed to be completely parallel to the liquid crystal display panel 1. Thus, the liquid crystal molecules of the liquid crystal layer 40 are not rotated within the same plane and create a defective liquid crystal display panel.

One common explanation for formation of the vertical field concludes that the vertical electric field is generated by static electricity formed at a rear surface, which is exposed without being in contact with the liquid crystal layer, of the second substrate 30. The static electricity is generated when the rear surface of the second substrate 30 contacts a human hand, or the like, after completion of the liquid crystal display panel 1. Accordingly, in the IPS-mode liquid crystal display device, a static electric removing conductive layer 36 of a transparent conductive material, such as Indium Tin Oxide (ITO), is formed at the rear surface of the second substrate 30 where the color filter layer is not formed to prevent accumulation of the static electricity. Although not shown in the drawings, the conductive layer 36 can dissipate the static electricity generated at the second substrate 30 through ground.

The conductive layer 36 is formed prior to a color filter formation process. Accordingly, as the second substrate with the conductive layer 36 formed thereon is conveyed to a color filter line, a color filter is formed.

FIG. 2 is a flow chart of a method for fabricating a color filter substrate of an IPS mode liquid crystal display device according to the related art. In FIG. 2, Step S101 includes forming a transparent conductive layer, such as ITO, on a rear surface of a second substrate by evaporation or sputtering processes.

In Step S102, the conductive layer 36 is annealed for about 130 to 140 seconds at a temperature of about 220° to 240° C. Accordingly, since the transparent conductive layer formed at the rear surface of the second substrate is amorphous, the transparent conductive layer has low transmittance and is not suitable for a transmission-type LCD device. Thus, the transparent conductive layer should be crystallized using an annealing process to improve the low transmittance.

In Step S103, the second substrate and the transparent conductive layer are crystallized through the annealing process and conveyed to the color filter layer formation system.

In Step S104, the rear surface of the second substrate, where the conductive layer is formed, is reversed to face upward upon conveyance to the color filter layer formation system.

In Step S105, the second substrate is loaded into a conveying unit, such as a cassette, to the color filter formation system for proceeding with formation of the color filter layer. Accordingly, since the rear surface of the second substrate faces upward, the front surface of the second substrate where a color filter layer is to be formed is loaded to be in contact with a guide bar of the conveying unit. However, foreign material is generated at the front surface of the second substrate by contacting the guide bar of the conveying unit. Accordingly, the foreign material hinders formation of a uniform color filter layer and damages rubbing fabric used during the subsequent rubbing process of an alignment layer coated on the second substrate.

The second substrate is maintained at a temperature of about 100° C. while being loaded into the conveying unit. Then, the second substrate is annealed at a temperature of 220° C. to 240° C.

SUMMARY OF THE INVENTION

Accordingly, the present invention is directed to a liquid crystal display device and method of fabricating a liquid crystal display device that substantially obviates one or more of the problems due to limitations and disadvantages of the related art.

An object of the present invention is to provide a method of fabricating a liquid crystal display device having simplified fabrication processes.

Another object of the present invention is to provide a method of fabricating a liquid crystal display device having a conductive layer for removing static electricity.

Another object of the present invention is to provide a liquid crystal display device having simplified fabrication processes.

Another object of the present invention is to provide a liquid crystal display device having a conductive layer.

Another object of the present invention is to provide a method of fabricating a liquid crystal display device for preventing generation of foreign material.

Another object of the present invention is to provide a method of fabricating a liquid crystal display device having a conductive layer for removing static electricity.

Another object of the present invention is to provide a liquid crystal display device having a conductive layer for removing static electricity.

Additional features and advantages of the invention will be set forth in the description which follows, and in part will be apparent from the description, or may be learned by practice of the invention. The objective and other advantages of the invention will be realized and attained by the structure particularly pointed out in the written description and claims hereof as well as the appended drawings.

To achieve these and other advantages and in accordance with the purpose of the present invention, as embodied and broadly described herein, a method of fabricating a liquid crystal display device includes providing a first substrate, forming a conductive layer on a rear surface of a second substrate, forming a black matrix layer on a front surface of the second substrate, baking the black matrix layer and annealing the conductive layer, forming a color filter layer on the front surface of the second substrate, and attaching the first and second substrates.

In another aspect, a method of fabricating a liquid crystal display device includes providing a first substrate, forming a conductive layer on a rear surface of a second substrate, forming a black matrix layer and a color filter layer on a front surface of the second substrate, simultaneously baking at least one of the black matrix layer and the color filter layer and annealing the conductive layer, and attaching the first and the second substrates.

In another aspect, a method for fabricating a color filter substrate of a liquid crystal display panel includes forming a transparent conductive layer on a first surface of a substrate, conveying the substrate to a color filter system, forming a black matrix layer and a color filter layer on a second surface of the substrate opposite to the first surface, simultaneously baking at least one of the black matrix layer and the color filter layer and annealing the transparent conductive layer.

In another aspect, a liquid crystal display device fabricated by a method includes providing a first substrate, forming a conductive layer on a rear surface of a second substrate, forming a black matrix layer on a front surface of the second substrate, baking the black matrix layer and annealing the conductive layer, forming a color filter layer on the front surface of the second substrate, and attaching the first and second substrates.

In another aspect, a liquid crystal display device fabricated by a method includes providing a first substrate, forming a conductive layer on a rear surface of a second substrate, forming a black matrix layer and a color filter layer on a front surface of the second substrate, simultaneously baking at least one of the black matrix layer and the color filter layer and annealing the conductive layer, and attaching the first and the second substrates.

In another aspect, a color filter substrate of a liquid crystal display panel fabricated by a method includes forming a transparent conductive layer on a first surface of a substrate, conveying the substrate to a color filter system, forming a black matrix layer and a color filter layer on a second surface of the substrate opposite to the first surface, simultaneously baking at least one of the black matrix layer and the color filter layer and annealing the transparent conductive layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings.

Figure 1A:
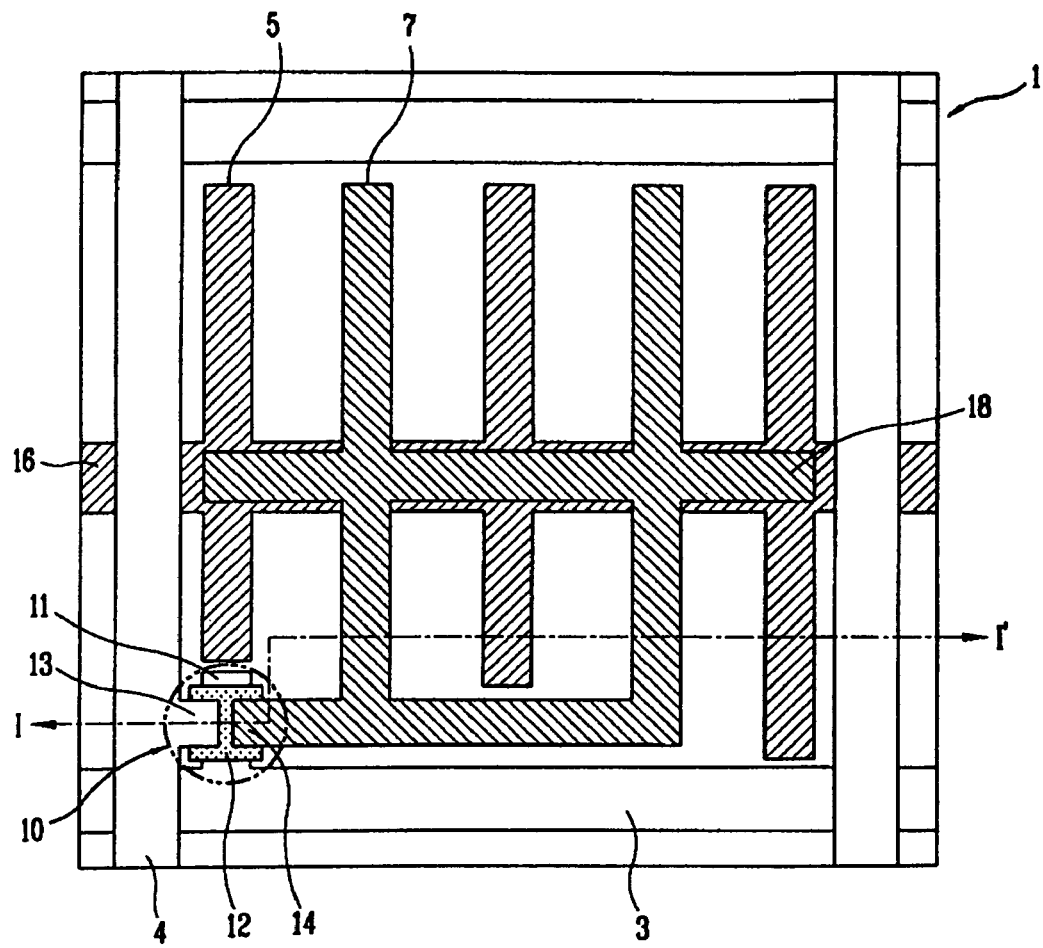
FIG. 1A is a plan view of an in-plane switching (IPS) mode liquid crystal display device according to the related art.
Figure 1B:
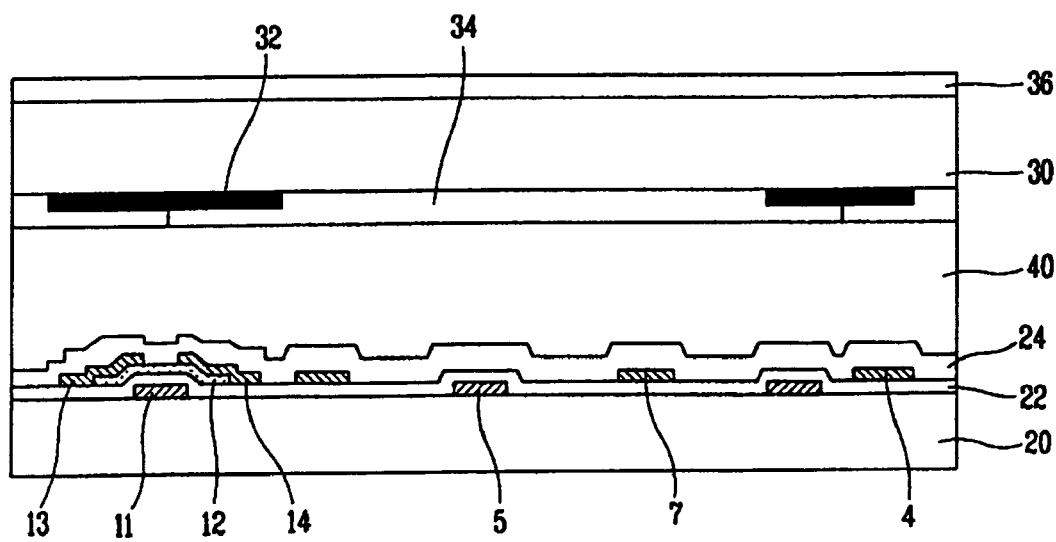
FIG. 1B is a cross sectional view along I-I' of FIG. 1A according to the related art.
Figure 2:
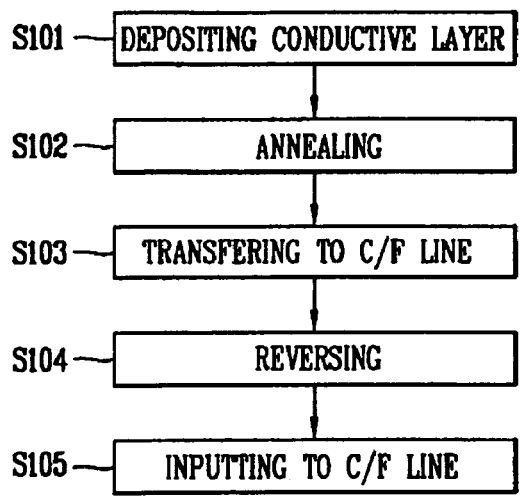
FIG. 2 is a flow chart of a method of fabricating a color filter substrate of an IPS mode liquid crystal display device according to the related art.
Figure 3:
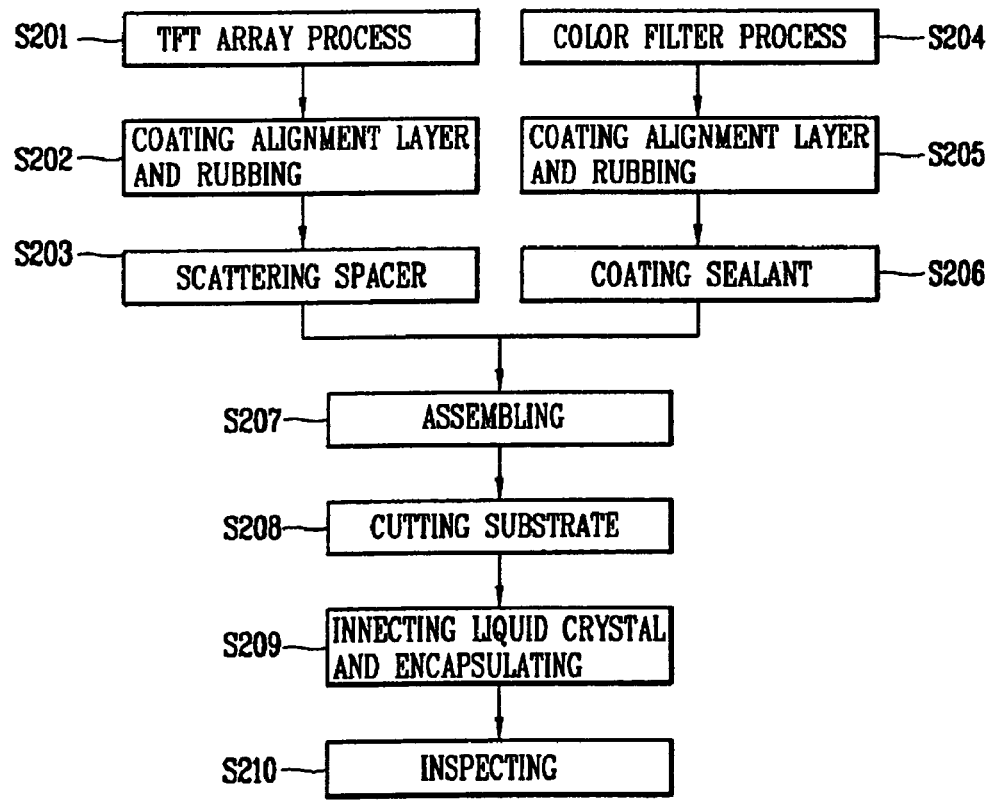
FIG. 3 is a flow chart of an exemplary method of fabricating an IPS mode liquid crystal display device according to the present invention.

FIG. 3 is a flow chart of an exemplary method of fabricating an IPS mode liquid crystal display device according to the present invention. In FIG. 3, the exemplary method of fabricating a liquid crystal display device may be divided into a TFT array process, a color filter process, and a cell process.

During Step S201 of the TFT array process, a plurality of gate lines and a plurality of data lines may be formed to define a pixel region on a first substrate, and a thin film transistor and a driving unit may be formed to be electrically connected to the gate lines and the data lines within the pixel region. In addition, a pixel electrode may be formed to be electrically connected to the thin film transistor to drive a liquid crystal layer when a signal is supplied via the thin film transistor.

During Step S204 of the color filter process, red (R), green (G), and blue (B) color filter layers for implementing color images and a common electrode may be formed on the second substrate.

During Step S202 of the TFT array process and Step S205 of the color filter process, an alignment layer may deposited on both the first and second substrates and rubbed to provide an initial alignment (i.e., pretilt angle) or a surface fixing (i.e., an alignment direction) to liquid crystal molecules of a liquid crystal layer formed between the first and second substrates.

During Step S203 of the TFT array process, spacers may be scattered on the first substrate to maintain a uniform cell gap.

During Step S206 of the color filter process, a sealant may be deposited along an outer edge of the second substrate.

During Step S207 of the cell process, the first and second substrates may be attached together by application of force.

During Step S208 of the cell process, the glass substrates of the first and second substrates may be cut into a plurality of unit liquid crystal display panels.

During Step S209 of the cell process, liquid crystal material may be injected through a liquid crystal injection hole formed in the sealant, and the liquid crystal injection hole may be encapsulated.

During Step S210, each of the unit liquid crystal display panels may be inspected.

Although not shown in FIG. 3, a transparent conductive layer, such as ITO, may be formed at a rear surface of the second substrate where the color filter layer is formed (i.e., an opposite surface of a surface where the color filter layer has been formed). In addition, an annealing process may be performed after formation of the transparent conductive layer (not shown) at the rear surface of the second substrate. Accordingly, without the annealing process, the substrate may be maintained at a room temperature even though the second substrate is conveyed and the front surface of the second substrate where the color filter layer is formed is in contact with a guide bar of a substrate cassette, thereby preventing generation of foreign material on the front surface of the second substrate. Crystallization of the transparent conductive layer may be performed when a black matrix or the color filter layer is formed on the color filter substrate. Thus, fabrication of the liquid crystal display device is simplified.

Figure 4A:
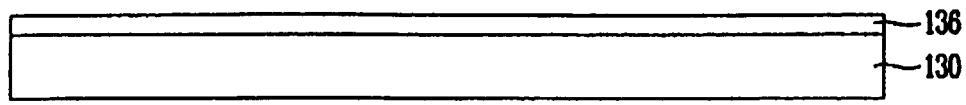
FIGS. 4A to 4D are cross sectional views of exemplary sequential processes of fabricating a color filter substrate of an IPS mode liquid crystal display device according to the present invention.
Figure 4B:
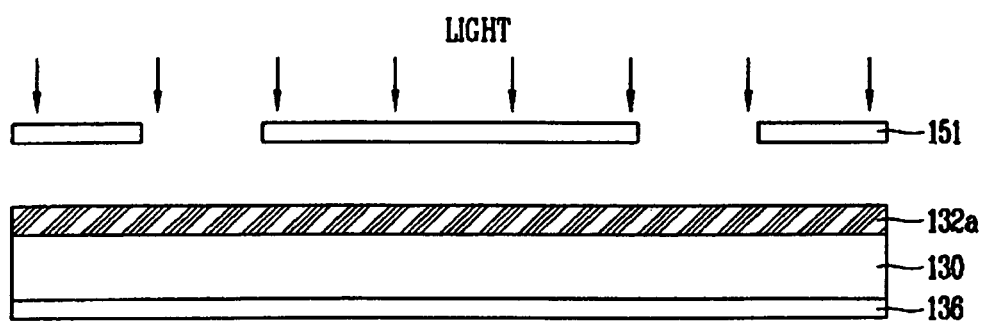
Figure 4C:
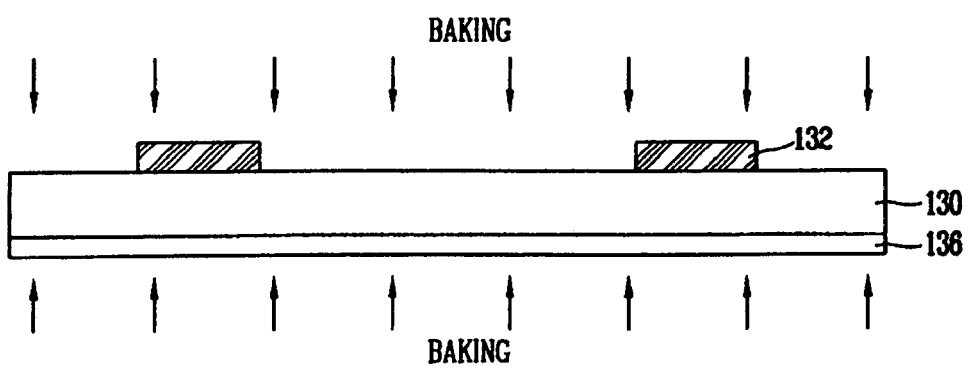
Figure 4D:
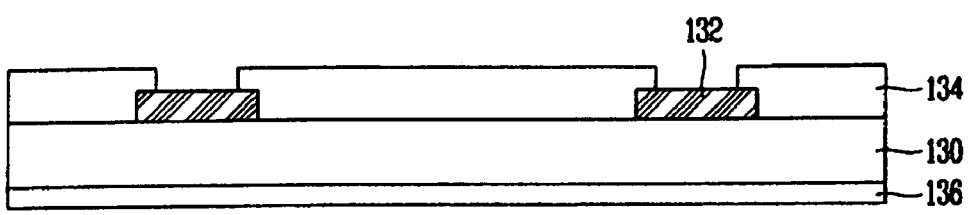
Figure 5:
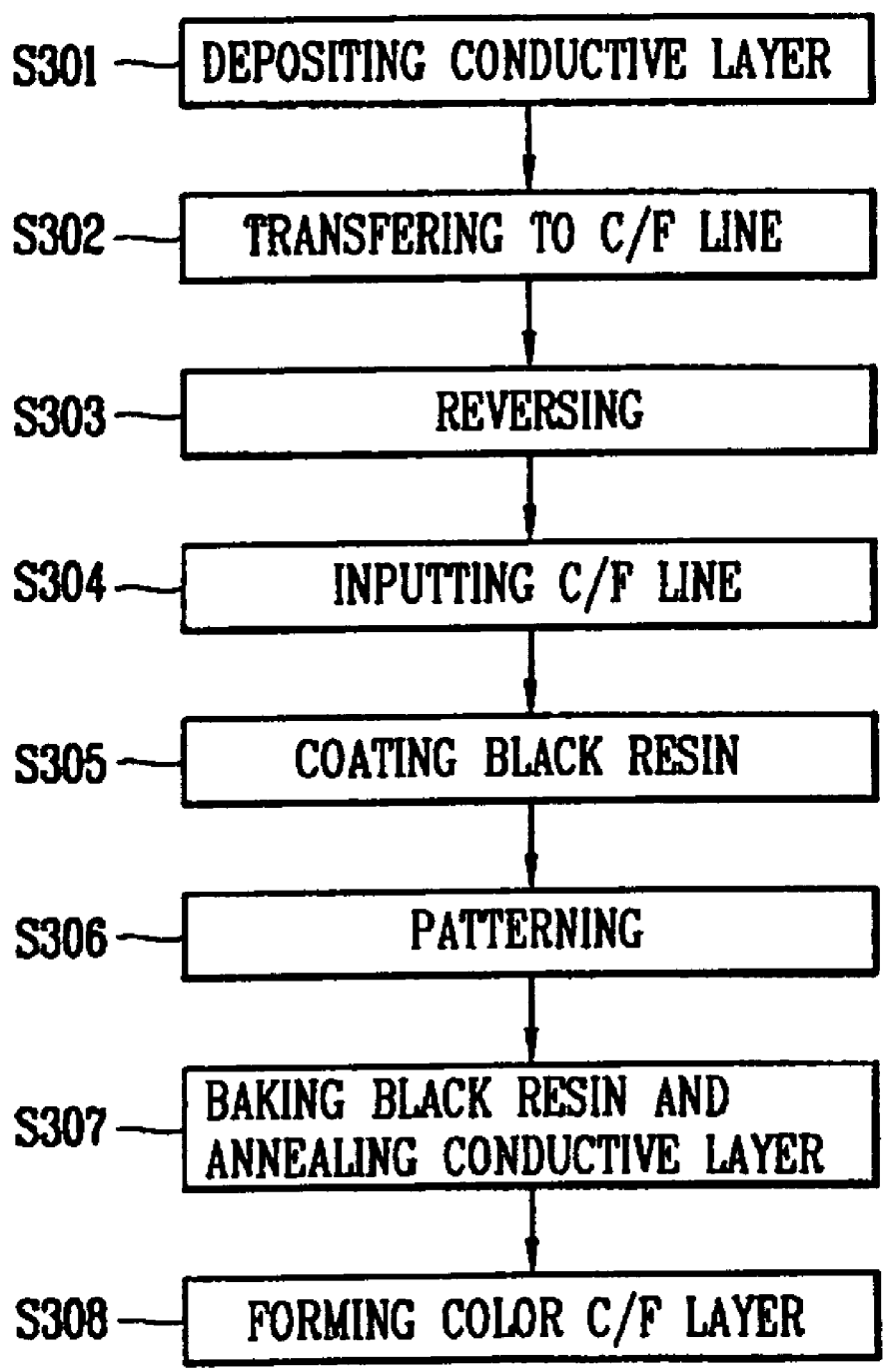
FIG. 5 is a flow chart of another exemplary method of fabricating a color filter of an IPS mode liquid crystal display device according to the present invention.

FIGS. 4A to 4D are cross sectional views of exemplary sequential processes for fabricating a color filter substrate of an IPS mode liquid crystal display device according to the present invention, and FIG. 5 is a flow chart of another exemplary method for fabricating a color filter of an IPS mode liquid crystal display device according to the present invention. In FIG. 4A and during Step S301 of FIG. 5, an amorphous conductive layer 136, such as ITO, may be formed at a portion of a rear surface, or on an entire rear surface of a second substrate 130 through evaporation or sputtering processes to remove any static electricity from the second substrate 130.

During Step S302 in FIG. 5, the second substrate 130 having the amorphous conductive layer 136 formed thereon may be loaded into a cassette (not shown) and conveyed to a color filter processing system (i.e., line). Accordingly, since the sputtering and evaporation processes may be performed at a temperature of about 10° C. to 30° C., a temperature of the second substrate 130 after loading may be about 10° C. to 30° C. Thus, no foreign material would be generated even if the second substrate 130 is in contact with the guide bar of the cassette (not shown).

During Steps S303 and S304, the second substrate 130 conveyed by the cassette may be reversed prior to, or in conjunction with loading into the color filter processing system. Accordingly, a front surface of the second substrate 130, which is opposite to the rear surface having the amorphous conductive layer 136, may face upward.

In FIG. 4B and during Step S305 in FIG. 5, a black resin 132a may be deposited on the front surface of the second substrate 130. The black resin 132a may include a carbon-based or pigment-based photoresist.

In FIG. 4B and during Step S306 in FIG. 5, a photo mask 151 may be positioned at the front surface of the second substrate 130, and ultraviolet light may be irradiated onto the black resin 132a. Then, a developing process may be performed by applying a developer to the black resin 132a. Next, the black resin 132a may be patterned to form a black matrix layer 132 (in FIG. 4C).

In FIG. 4C and during Step S307 in FIG. 5, the patterned black matrix layer 132 may be baked at a temperature of about 210° C. to 230° C. Accordingly, during baking the amorphous conductive layer 136 formed on the rear surface of the second substrate 130 may be annealed during baking of the patterned black matrix layer 132. Thus, the amorphous conductive layer 136 may be crystallized, thereby improving transmittance of the conductive layer 136.

In FIG. 4D and during Step S308 in FIG. 5, a color resist may be deposited on the front surface of the second substrate 130 having the black matrix 132 formed thereon. Then, the color resist may be repeatedly etched to form a color filter layer 314 having red (R), green (G), and blue (B) sub-color filters.

Accordingly, annealing of the amorphous conductive layer 136 may not be immediately performed after formation of the amorphous conductive layer 136 on the rear surface of the second substrate 130. Thus, annealing of the amorphous conductive layer 136 may be simultaneously performed during the baking process of the black matrix layer. Therefore, the fabrication process may be simplified.

In addition, when the second substrate 130 having the conductive layer 136 formed thereon is loaded and conveyed into the cassette, the second substrate 130 may be maintained at room temperature (i.e., about 10° C. to 30° C.). Thus, generation of foreign material may be prevented even when the front surface of the second substrate 130 and the guide bar of the cassette contact each other. As a result, formation of defects during the color filter process may be prevented.

The amorphous conductive layer 136 may be annealed during the color filter process, not during the black matrix process. For example, when the black matrix is formed on the first substrate (i.e., black matrix on the TFT array substrate or TFT array substrate on the black matrix structure), the amorphous conductive layer 136 may be annealed during baking of the color photoresist to form the red, green, and blue sub-color filters.

If the black matrix layer includes a metal, such as Cr or CrOx, annealing of the amorphous conductive layer 136 may be formed when the photoresist used for patterning the metal layer formed of Cr or CrOx is baked.

The amorphous conductive layer of the second substrate may be used in the IPS-mode liquid crystal display devices. However, the amorphous conductive layer may also be adopted for liquid crystal display devices of various modes, such as the Twisted Nematic (TN) mode liquid crystal display device or a Vertical Alignment (VA) mode liquid crystal display device. Accordingly, the present invention may be adopted for a method of fabricating liquid crystal display devices of various modes and various structures, without being limited to the IPS-mode liquid crystal display devices.

It will be apparent to those skilled in the art that various modifications and variations can be made in the liquid crystal display device and method for fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    providing a first substrate;
    forming a conductive layer on a rear surface of a second substrate;
    forming a black matrix layer on a front surface of the second substrate;
    heating simultaneously the black matrix and the conductive layer to bake the black matrix layer and anneal the conductive layer;
    forming a color filter layer on the front surface of the second substrate; and
    attaching the first and second substrates.

2. The method according to claim 1, wherein the conductive layer includes indium tin oxide.

3. The method according to claim 1, wherein the black matrix layer includes a black resin.

4. The method according to claim 3, wherein forming the black matrix layer comprises:
    depositing a black resin on the front surface of the second substrate;
    irradiating light onto portions of the black resin using a mask; and
    developing the irradiated portions of the black resin.

5. The method according to claim 1, wherein the black matrix includes metal.

6. The method according to claim 5, wherein the black matrix includes at least one of Cr and CrOx.

7. The method according to claim 5, wherein forming the black matrix layer comprises:
    depositing a metal on the front surface of the second substrate; and
    etching portions of the metal by using a photoresist.

8. The method according to claim 1, wherein the baking and annealing are performed at a temperature of about 210° to about 230° C.

9. The method according to claim 1, wherein providing the first substrate comprises:
    forming a plurality of data and gate lines defining a plurality of pixel regions on the first substrate;
    forming a thin film transistor within the pixel region; and
    forming at least one pair of electrodes within the pixel region.

10. A liquid crystal display device fabricated by a method, comprising:
    providing a first substrate;
    forming a conductive layer on a rear surface of a second substrate;
    forming a black matrix layer on a front surface of the second substrate;
    heating simultaneously the black matrix and the conductive layer to bake the black matrix layer and anneal the conductive layer;
    forming a color filter layer on the front surface of the second substrate; and
    attaching the first and second substrates.

11. The device according to claim 10, wherein the conductive layer includes indium tin oxide.

12. The device according to claim 10, wherein the black matrix layer includes a black resin.

13. The device according to claim 10, wherein forming the black matrix layer comprises:
    depositing a black resin on the front surface of the second substrate;
    irradiating light onto portions of the black resin using a mask; and
    developing the irradiated portions of the black resin.

14. The device according to claim 10, wherein the black matrix includes metal.

15. The device according to claim 10, wherein the black matrix includes at least one of Cr and CrOx.

16. The device according to claim 10, wherein forming the black matrix layer comprises:
    depositing a metal on the front surface of the second substrate; and
    etching portions of the metal by using a photoresist.

17. The device according to claim 10, wherein the baking and annealing are performed at a temperature of about 210° to about 230° C.

18. The device according to claim 10, wherein providing the first substrate comprises:
    forming a plurality of data and gate lines defining a plurality of pixel regions on the first substrate;
    forming a thin film transistor within the pixel region; and
    forming at least one pair of electrodes within the pixel region.

* * * * *